Fig. 4.
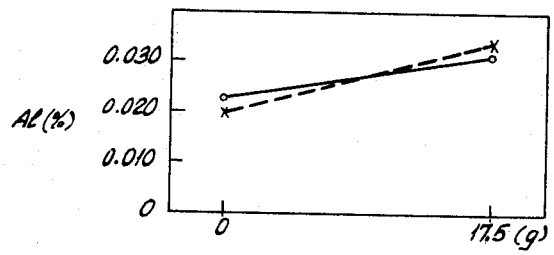
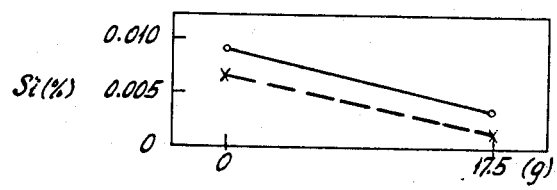
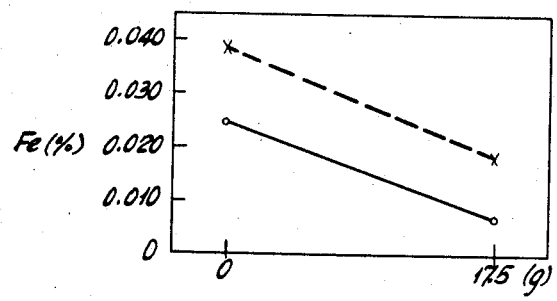
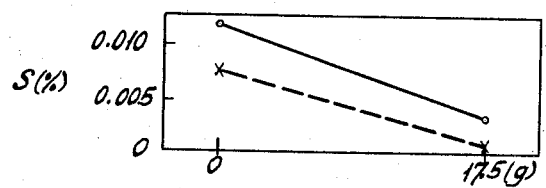
QUANTITY OF SEPARATELY
ALLOCATED CaF₂
(PER 200mm OF THE BEAD LENGTH)
INVENTOR
HAJIME NAKAMURA
BY
Nolte & Nolte
ATTORNEYS

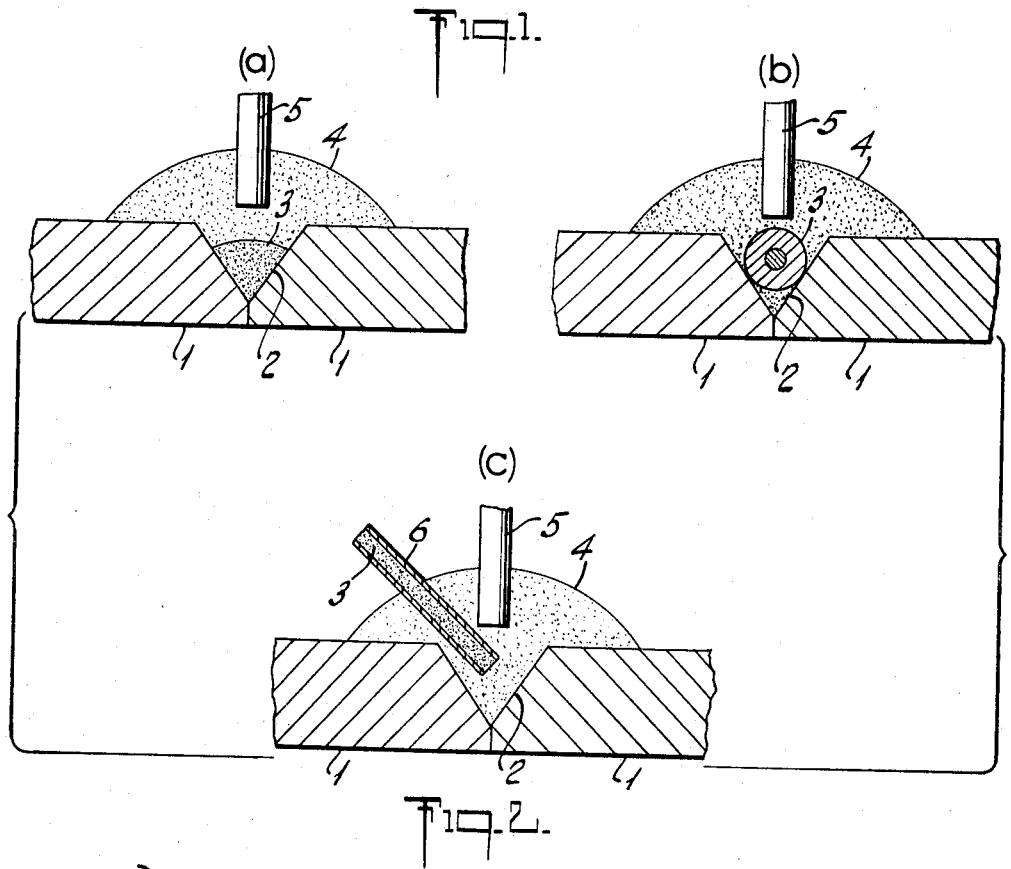
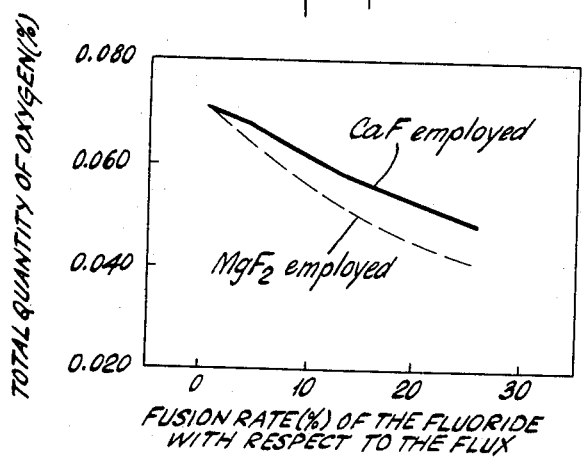

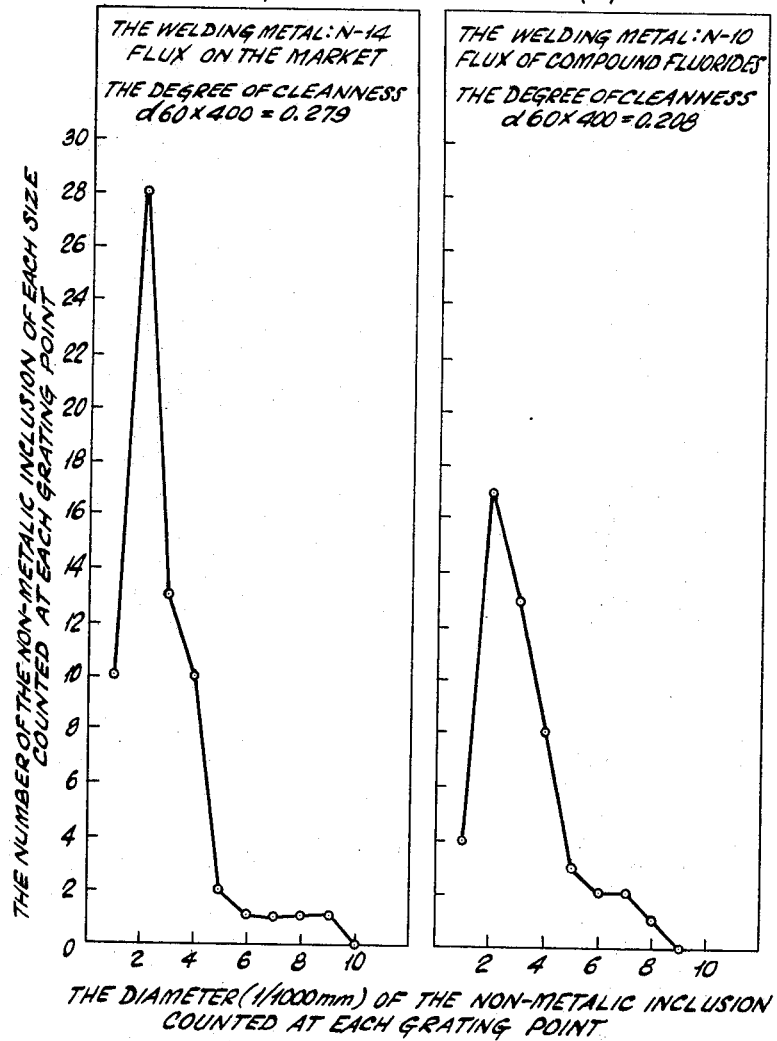

United States Patent Office 3,493,712
Patented Feb. 3, 1970

3,493,712
HIGH TOUGH DEPOSIT METAL WELDING PROCESS
Hajime Nakamura, Tokyo-to, Japan, assignor to Ishikawajima-Harima Jukogyo Kabushiki Kaisha, Tokyo-to, Japan, a company of Japan
Filed June 23, 1967, Ser. No. 648,396
Claims priority, application Japan, June 25, 1966, 41/41,186
Int. Cl. B23k 25/00, 9/18
U.S. Cl. 219—73           5 Claims

ABSTRACT OF THE DISCLOSURE

A welding process in which the deposit metal is particularly tough. Specifically, in a high heat input welding operation a fluoride or mechanical mixture of fluorides is disposed in proximity to a neutral or weakly acidic flux.

---

There are roughly two kinds of fluxes that conventionally have been used for a large heat input automatic welding; one kind with low basicity closer to acidity and the other with high basicity. However when the flux of low basicity is used, the content of the silicate compound (the so-called large non-metallic inclusion) in the deposit metal increases, which is accompanied by the result that the toughness of the deposit metal tends to decrease; when the acidic slags of below —0.70 are produced in practice, the toughness of the deposit metal is greatly decreased. While it is a well-known fact that when a highly basic flux is used, impact value of the deposit metal is increased and this idea is applied to the fluxes on the market. However this idea is applied only to the welding of multiple layers with a heat input under medium, where the efficiency of the welding is low, and it is not applied to the automatic welding with large heat input. This is because of the fact that in the case if the welding with a single layer or a small number of layers the impact value is rather decreased. Accordingly, in the case of submerged arc welding which uses a large heat input, the increase in the toughness of the deposit metal can not be obtained by simply increasing the basicity of flux.

The purpose of the present invention is to gain high toughness of the deposit metal by means of large-heat-input welding with a single layer or a small number of layers.

FIGS. 1a, b, and c are the figures explaining the present invention, FIG. 1a illustrating the welding process in which the fluoride powder is allocated separately to the welding beveling, onto which the flux on the market is sprinkled, FIG. 1b illustrating the welding process in which the fluoride applied and solidified around the iron wire or the fluoride enclosed in the iron plate or the iron tube is allocated to the welding beveling, onto which the flux on the market is sprinkled, and FIG. 1c illustrating the welding process in which the fluoride enclosed in the iron tube or in the rounded iron plate is supplied from outside of the upper layer of the flux to the beveling part manually or automatically during the welding process. FIG. 2 is a diagram explaining the oxygen content in the weld metals in the case of high-tough fine-grained steels, taking the fusion rate (as percent) of the fluoride with respect to the flux on the horizontal axis and the total quantity of oxygen on the vertical axis. FIG. 3 illustrates the degree of cleanness of the welding metal measured by applying point counting method of JIS. G0555) to the section of the weld metal, taking the diameter (1/1000 mm.) of the non-metallic inclusion on the horizontal axis and the number of the non-metallic inclusion of each size counted at each grating point on the vertical axis, FIG. 3a showing the case according to the conventional process and FIG. 3b the case according to the process of the present invention. FIG. 4 is a diagram illustrating the metal content of the weld metal in the case of the fine-grained high-tough steel taking the quantity of separately allocated $CaF_2$ (per 200 mm. of the bead length) on the horizontal axis.

In FIG. 1a is shown a method of submerged arc welding with large heat input, the characteristic of which is that double covering of the welding beveling part 2 is attained by sprinkling a proper amount of certain meltmetal-refining chemical compounds (fluorides) 3 to fill the said beveling part 2 which is then covered with almost neutral flux 4 of the ordinary kind having a high operational efficiency. The purpose of the present invention can also be attained by the process as is shown in FIG. 1b where the fluoride 3 is applied to the core wire of the welding rod, or the welding rod is substituted by the core composite welding wire comprised of the iron plate or iron pipe enclosing the fluoride to be applied to the welding beveling part 2, over the surface of which flux 4 on the market is sprinkled, or, similarly the purpose of the present invention can be also attained by the process as is shown in FIG. 1c wherein the iron pipe 6 contains fluoride 3 which is supplied automatically and successively to the welding beveling part. In the figures, 1 refers to the welded material, and 5 to the welding rod. In any case it is necessary that the fluirode is allocated straight below the electric arc in order to let the resolved products, which are obtained by pyrolyzing the fluoride straight below the electric arc, react fully.

Desirable kinds of fluorides will be such as are not hygroscopic but pyrolyzable straight below the electric arc, a part of the product of the reaction generating the gaseous body which expels the silicate compound out of the metal by acting on the silicate compound (large non-metalic inclusion) in the depositmetal, and the other part of the product having the reducing effect and the reduce product showing basic. It is found from the result of our practical experiments that the blending with the compound of one or more than one of $CaF_2$, $MgF_2$, $AlF_2$, etc. is suitable.

Though the flux for submerged arc welding on the market for mild steel contains a small quantity of a certain kind of such fluoride, this addition mainly aims to regulate the fluidity of slags and increase the efficiency of operation; mainly $CaF_2$ is used and the content is only a few percent. Since such fluorides have little refining effect, the result as good as in the case of the process of the present invention can not be expected.

According to the process of the present invention, $MgF_2$, $CaF_2$, $AlF_2$ and so forth, supplied intensively to straight below the arc in one or in a multiplex, relates to refining in extremely high density and the reaction product and the remaining fluoride come to be contained in the composition of the produced slag fusing with the flux in the upper layer successively with the progress of the welding. It has been found, therefore, that the proper quantity of the floride for the efficient use can be determined by the quantity of the remaining fluoride in the produced slag. For example, it is found that in the case of $CaF_2$, the quantity of about 15 to 25% of the melting quantity (the weight of the melting flux) of the flux in the upper layer is most suitable, and when this amount exceeds 30 percent the effect of toughness rather decreases. The density of $CaF_2$ remaining in the produced slag under the said proper condition is from 10 to 20 percent (0.13–0.26 mol percent). When $MgF_2$ is adopted, it is more effective with less quantity. The characteristic other than the said direct effect concerning the function of these fluorides is that, because it has a function to reduce the oxide in the slag after it fuses with the fluxes in the upper layer into the slag, it automatically discharges out of the system the superfluous silicate which in the conventional process moves into the melt metal to cause the production of noxious silicate compound. Since the remaining fluoride relates to these reactions in the slag and loses fairly large amount of fluorine, necessary and sufficient amount from the total point of view is required to be used in order to achieve the expected effect. If the metals are welded by submerged arc in a usual process by using the so-called melting type flux to which the fluoride having these characteristics is added during the melting process of the flux in advance, its effect is naturally far behind to the process of the present invention, because it is evident that the real content of fluorine remaining in the flux is greatly reduced. Though a little better effect can be achieved by adopting such fluxes as the bonded type in which the fluoride is mechanically mixed, the effect is also inferior to that of the allocation process of the present invention, because the density of the fluorine scattered in the fluxes is kept low since the limitation in the efficiency of operation is accompanied.

Here is an explanation of the reason why the deposit metal of a single or a small number of layers that are welded by submerged arc welding process with large heat input with fluoride and the fluxes in the market being allocated separately becomes thus highly tough, referring to some experimental results as follows. In the above mentioned welding process to allocate fluorine separately, the beveling part was filled with 20% of the whole flux through $CaF_2$ the surface thereof being sprinkled with nearly neutral flux of an ordinary kind in the market and the total content of the oxygen in the submerged-arc-welded single layer deposit metal was analysed. The result was that, as shown in FIG. 2, the total quantity of oxygen in the total deposit metal by this welding process is greatly reduced in comparison with that of the deposit metal where only the flux in the market was used. The same results have been obtained with respect to the mild steel, high-tension steel, and the low-temperature tough steel. The reason is that the fluoride such as $CaF_2$, $MgF_2$ and $AlF_2$ has pyrolyzed at the temperature of just below the electric arc to produce a strong reducing metal such as Ca, Mg, Al, etc., and these have combined with the oxygen which exists in the deposit metal.

While it was found by the microscope tests that the degree of cleanness is higher in comparison with the deposited metal obtained by the conventional welding process and that especially the large type slag inclusion is greatly reduced, and also that only fine ones are infinitely scattered according to the microscope test and the electron microscope test. That is, the large type slag inclusion (A- and B-type slag inclusion) (about $1\mu$ to $25\mu$ that have usually been said to have bad effects on mechanical properties are all reduced in its sizes to below 10, and new numerous slag inclusion of about below 1 (0.1 to 0.5) which is called the microscopic size are found scattered. According to the result of chemical analysis of the separated non-metallic slag inclusion, it was found that the contents of Si, Fe and S were greatly reduced as shown in FIG. 4. This is because the fluorine gas produced by the separation of the fluoride decomposes $SiO_2$ or other silicate compounds in the desposit metal into $SiF_4$ and expels it in the form of gas out of the metal; this shows that $O_2$ was combined with Ca, Mg, etc., and remained scattered in the deposit metal as fine CaO and MgO. It seems that this refining effect was made more effective by the agitating effect of the melting metal straight below the electric arc.

Comprehensive consideration will give the following facts as the reasons why the deposit metal is refined and increased in its toughness by the welding process of the present invention whose characteristic is that the metal fluoride is separately allocated on the beveling part and is welded with large heat input. The first effect is that the fluorine gas, produced by the high-temperature decomposition of the fluoride straight below the arc, acts on $SiO_2$ and the silicate compound in the melted metal to make it evaporate as $SiF_4$ gas on one hand and expel it out of the meal, and on the other hand the fluorine gas also expels out of the metal the various kinds of undesirable gases ($H_2N_2$ and so forth) contained in the melting metal together with the $SiF_4$ gas through agitating effect. The second effect is that the strong deoxydizing metal such as C and Mg produced by the decomposition of fluoride kills the hot molten metal by strongly deoxydizing the various kinds of oxides in the melting metal on one hand, and on the other hand the said metals act on the sulfur to make it easily be absorbed into the slag as a more stable sulfide. It should be noted that since the slags produced in this welding process contain unaffected $CaF_2$ or $HgF_2$ fused with the flux to have acted on the upper layer of the deposit metal and the non-metalic slag inclusion expelled out of the hot molten metal, it is necessary that the composition of the flux used on the upper layer be well adjusted in order to maintain the basicity at a certain proper level for the efficiency of the chemical action of these produced slags. In the practical application of the welding process of the present invention it is desirable that the flux to be used on the upper layer is of weak acidity or neutrality; in an embodiment of the present invention such kind of a flux which shows weak basicity when it has turned into slags after welding. A similar fact concerning the above described reaction of the flux to turn into slags has been observed in produced slags after welding and these flux (containing fluoride) which cast into a water jacketed steel mould, after melting. Also in this case it is well known that mechanical mixture of $CaF_2$ and $MgF_2$ ingredients is more advantageous than $CaF_2$ alone in that the amount used can be reduced and also in that the impact value can be increased. Since the amount of unaffected fluoride is related to the physical characteristic, especially melting point and fluidity, of the produced slag, it is not desirable that the amount of unaffected fluoride be greater or less than a certain proper amount. It is verified by the result of the experiments that in the process of the present invention the proper range of the fluoride content is approximately 5–20%. In the determination of the content of the fluoride (all inclusive) the selection of the composition of the slags to be produced after welding, chemical composition of deposit metal, the form of oxide to be produced, melting point, etc., must be taken into consideration.

Table 1 below shows, for reference, the blending of the ingredients of a typical flux for obtaining deposit metal having high toughness according to the welding process of the present invention. It should be taken for granted that in applying this blended flux the fluoride of the flux is separately placed on the beveling to be covered by the other flux.

TABLE 1

|  | Group A | Group B | Group C |
| --- | --- | --- | --- |
| Blended Flux Ingredients: |  |  |  |
| $SiO_2$ | 26–41 | 29–37 | 32–40 |
| MnO | 13–24 | 11–22 | 15–30 |
| CaO | 12–35 | 13–22 | |
| MgO | 0–5 | 5–11 | 16–22 |
| $CaF_2$ | 8–26 | 6–13 | |
| $MgF_2$ | | 1–4 | 7–21 |
| Others * | <12 | <12 | <12 |

An example of blending a typical flux symbol * shows the grand total of one or more than one kind of FeO, $Na_2O$, $K_2O$, BaO, $LiO_2$, $TiO_2$, $Al_2O_3$, ZrO, etc.

Each ingredient of the composition enumerated in this table is widely used in a conventional flux on the market and the characteristic common to these fluxes are that basic oxides, acidic oxides and fluorides are blended and the flux shows no extreme acidity nor basicity as a whole.

Above mentioned basicity was calculated from the following formula and the basicity of $-0.05-+1.25$ of the produced slags is appropriate for the ingredients in Table 1, i.e., their values correspond approximately to the range of neutrality to weak basicity.

$$B_L \text{ (basicity)} = \Sigma a_i N_i$$

Where $N_i$ = mols of the respective oxide,
$a_i$ = constant peculiar to the respective oxide.

Example: $B_L$ = +4.80 (mols of MnO as percent) +6.05 (mols of CaO as percent) +4.00 (mols of MgO as percent) +3.40 FeC −6.31 (mols of $SiO_2$ as percent) −4.97 TiO −0.20 $Al_2O_3$.

With respect to the ingredient of the core wire to be used in the welding process of the present invention, there is no special qualification and the conventional kinds of materials on the market will show satisfactory effect; especially core wires containing Mo are effective for the improvement of toughness.

In the following an explanation will be given of results of the experiments concerning the chemical ingredients and basicity of the produced slags, 2 mm. V-notch Charpy impact values of deposit metals at 0° C., total oxygen content of the deposit metal, the change in the chemical ingredients of the separated non-metallic slag inclusion, and so forth in the case of the submerged arc welding of various steels of a single layer with large heat input with core wires, being replaced, welding condition being changed, and fluxes being alternated. Besides, the chemical ingredients of deposit metals and the change in 2 mm. V-notch Charpy impact values at 0° C. and −17° C., when the above mentioned welding process is applied to two-electrode submerged arc welding, will be described, and also the result of the experiment of ingredients of flux, generation of slags, slags, chemical ingredients of deposit metals, 2 mm. V-notch Charpy impact values at 0° C. and −20° C., and so forth, when the above mentioned welding process is applied to the welding of $CO_2$ gas, will be explained.

Table 2 in the following shows kinds of steel tested, symbols, thickness of steel plates, and chemical composition, Table 3 use of the core wire for welding on the market used in this experiment, symbols of core wires, and the results of chemical analyses of the core wires. In the tables, IN steel refers to fine-grained steel containing aluminum nitride.

Also, conditions of welding (welding process, forms and angles of beveling, voltage of welding, current, welding speed and the number of layers) are shown in the following Table 4.

TABLE 2 (No. 1)

[Tested Steel and its Chemical Composition, Percent]

| Kind of steel | Symbol | Thickness of plate (m./m.) | C | Mn | Si | P | S | Al Total |
|---|---|---|---|---|---|---|---|---|
| IN Steel (40 kg.) | IN-A | 25 | 0.13 | 1.33 | 0.30 | 0.011 | 0.021 | 0.071 |
| Do | IN-B | 35 | 0.10 | 1.12 | 0.24 | 0.011 | 0.013 | 0.095 |
| IN Steel (50 kg.) | IN-C | 25 | 0.16 | 1.23 | 0.35 | 0.020 | 0.023 | 0.097 |
| Do | IN-D | 25 | 0.11 | 1.00 | 0.27 | 0.013 | 0.014 | 0.057 |
| IN Steel (HY 80) | IN-80 | 20 | 0.094 | 0.75 | 0.24 | 0.019 | 0.009 | 0.064 |
| Aluminium nitride containing steel (for low temperature). | FLT | 25 | 0.10 | 1.27 | 0.28 | 0.015 | 0.005 | 0.039 |
| High-tension steel (50 kg.) | SM50 | 35 | 0.14 | 1.36 | 0.40 | 0.015 | 0.017 | |

TABLE 2 (No. 2)

[Tested Steel and its Chemical Composition, Percent]

| Kind of steel | Symbol | Thickness of plate (m./m.) | Al So.l | $Al_2O_3$ | AlN | N | Ni | Cr | Mo |
|---|---|---|---|---|---|---|---|---|---|
| IN Steel (40 kg.) | IN-A | 25 | 0.064 | 0.014 | 0.040 | 0.015 | | | |
| Do | IN-B | 35 | 0.091 | 0.007 | 0.037 | 0.011 | | | |
| IN Steel (50 kg.) | IN-C | 25 | 0.086 | 0.020 | 0.036 | 0.015 | | | |
| Do | IN-D | 25 | 0.050 | 0.013 | 0.034 | 0.015 | | | |
| IN Steel (HY 80) | IN-80 | 20 | 0.060 | 0.007 | 0.057 | 0.022 | 2.51 | 0.29 | 0.41 |
| Aluminium nitride containing steel (for low temperature). | FLT | 25 | 0.036 | 0.005 | | 0.011 | | | |
| High-tension steel (50 kg.) | SM50 | 35 | | | | | | | |

TABLE 3

[Chemical Composition of Core Wire for Welding, percent]

| Use of steel material on the market | Symbol of core wire | C | Mn | Si | P | S | Mo |
|---|---|---|---|---|---|---|---|
| For submerged arc welding | W-A | 0.06 | 0.65 | 0.03 | 0.012 | 0.010 | |
| Do | W-B | 0.07 | 0.75 | 0.01 | | | 0.50 |
| Do | W-C | 0.10 | 1.00 | 0.02 | 0.012 | 0.013 | |
| Do | W-D | 0.12 | 1.50 | 0.02 | 0.013 | 0.020 | |
| Do | W-E | 0.08 | 1.50 | 0.04 | 0.011 | 0.015 | 0.50 |
| Do | W-F | 0.08 | 1.00 | 0.30 | 0.008 | 0.013 | |
| For $CO_2$ gas arc welding | W-G | 0.12 | 1.08 | 0.51 | | | |

TABLE 4

[Summary Table of the Welding Conditions]

| Welding process | Beveling, Form/Size | Symbol of conditions | Welding voltage, volt | Welding current, amp. | Welding speed, cm./min. | Number of layers |
|---|---|---|---|---|---|---|
| Submerged arc | 60°,V, 10 m./m. depth | C-A | 37–39 | 900 | 33 | 1 |
| Do | 70°,V, 10 m./m. depth | C-B | 38 | 850 | 35 | 1 |
| Tandem type submerged arc | 60°,V, 20 m./m. depth | C-C | 41 | 1,000 ×2 | 40 | 1 |
| $CO_2$ gas arc | do | C-D | 38 | 500 | 30 | 1 |

Blending ingredients of various kinds of fluxes which cover over the fluorides and the basicity of the ingredients are shown in the following Table 5.

amount of the same kind of fluorides was used. This result shows that the flux whose produced slags show the basicity of neutrality or weak basicity is appropriate as TABLE 5
[Chemical Composition of Tested Flux, Percent]

| Group | Symbol | $SiO_2$ | $MnO_2$ | CaO | $CaF_2$ | MgO | $MgF_2$ | $Al_2O_3$ | $TiO_2$ | FeO | $B_L$ |
|---|---|---|---|---|---|---|---|---|---|---|---|
| Group 1 | F-A | 30 |  | 30 |  | 20 |  | 10 |  |  | +2.08 |
|  | F-B | 42 | 15 | 25 |  | 7 |  | 2 | 5 |  | −0.08 |
| Group 2 | F-C | 37 | 19 | 18 | 10 | 4 |  | 2 | 3 | 2 | −0.36 |
|  | F-D | 37 | 17 | 15 | 6 | 14 |  |  |  | 2 | +0.37 |
| Group 3 | F-E | 12 | 13 |  |  | 4 |  | 27 | 27 | 30 | −0.40 |

The following Table 6 shows the chemical ingredients and the basicity $B_L$ of the produced slags when the flux on the market of Group 1 is used. Table 7 shows the 2 mm. V-notch Charpy impact value of the deposit metal at 0° C. when the flux of Group 1 and the fluoride $CaF_2$ are allocated separately by 15 and 25%.

the flux to be used in the welding process of the present invention; it is important to choose the flux of the proper basicity for covering the surface.

Further as shown in Table 8, is is found that when the flux of Group 2 such as flux F-C whose basicity is −0.36 the impact value is increased to more than 10 kg.-m./cm.², TABLE 6.—SLAGS PRODUCED BY THE FLUXES CONTAINING PLURAL NUMBER OF FLUORIDES
[The case where the fluxes in Group 1 is tested]

| Generated Slag | | | | | | | | | | |
|---|---|---|---|---|---|---|---|---|---|---|
| Symbol | $B_L$ | $SiO_2$ | MnO | CaO | $CaF_2$ | MgO | $MgF_2$ | $Al_2O_3$ | $TiO_2$ | FeO |
| S-A | +2.14 | 30 |  | 32 | 12 | 18 |  | 3 |  | 1 |
| S-B | +0.22 | 35 | 11 | 26 | 11 | 4 |  | 2 | 3 | 6 |

TABLE 7.—NOTCH TOUGHNESS OF THE WELDING METAL IN A SINGLE LAYER
[The Case Where the Fluxes in Group 1 is Tested]

| Flux containing plural number of fluorides | | Produced Slag | | Welding core wire | Steel plate | Welding condition | Welding Metal | | 2 mm. V-notch Charpy impact value (kg.m./cm.²) 0° C. |
|---|---|---|---|---|---|---|---|---|---|
| Tested flux | Mixed fluoride, percent | Symbol | $B_L$ |  |  |  | Symbol | Mo, percent |  |
| F-A | $CaF_2$, 15 | S-A | +2.14 | W-A | IN-C | C-A | D-1 |  | 1.4 |
| F-A | $CaF_2$, 15 | S-A | +2.14 | W-A | IN-C | C-A | D-2 | 0.50 | 1.3 |
| F-B | $CaF_2$, 25 | S-B | +0.22 | W-A | IN-C | C-A | D-3 |  | 7.8 |
| F-B | $CaF_2$, 25 | S-B | +0.22 | W-A | IN-C | C-A | D-4 | 0.50 | 11.5 |

It can be known from this result that the 2 mm. V-notch Charpy impact value of deposited metals which produced the slags of the basicity of +2.14 is as low as that of the flux on the market only regardless of whether the core wire contains Mo or not, and that the addition of $CaF_2$ had completely no effect. However, in the case of the flux which produced the slags of the basicity of +0.22, 2 mm. V-notch Charpy impact of the value at 0° C. increased to 7.8–11.5 kg.-m./cm.² whatever the ingredients of the core wire might have been, although the same if the basicity of the produced slag becomes −0.54–+1.13 by the separate allocation of fluorides and it even reaches 16 kg.-m./cm.² with the increase of the amount added. The same tendency is shown in the case where the $MgF_2$ is used; the impact value is increased to 12–17 kg.-m./cm.² with less amount of $MgF_2$ added than the case where $CaF_2$ is added. This experiment too shows that the basicity of the slags generated is efficient at around −0.36 in the application of the present welding process.

TABLE 8.—NOTCH TOUGHNESS OF THE WELD METAL IN A SINGLE LAYER
[The Case of Fluxes in Group 2]

| Flux containing plural number of fluorides | | Produced slags | | Welding core wire | Steel material | Welding condition | Welding metal | | 2 mm. V-notch Charpy impact value (kg.m./cm.²) 0° C. |
|---|---|---|---|---|---|---|---|---|---|
| Fluoride allocated separately, grams | Flux for covering | Symbol | $B_L$ |  |  |  | Symbol | Mo, percent |  |
|  | F-C | S-1 | −0.54 | W-B | IN-C | C-A | N-1 | 0.60 | 10.6 |
| $CaF_2$, 5 | F-C | S-2 | +0.65 | W-B | IN-C | C-A | N-2 | 0.60 | 11.7 |
| $CaF_2$, 10 | F-C | S-3 | +0.93 | W-B | IN-C | C-A | N-3 | 0.60 | 13.5 |
| $CaF_2$, 15 | F-C | S-4 | +1.13 | W-B | IN-C | C-A | N-4 | 0.60 | 15.8 |
| $CaF_2$, 20 | F-C | S-5 | +1.05 | W-B | IN-C | C-A | N-5 | 0.60 | 16.2 |
| $CaF_2$, 25 | F-C | S-6 | +0.63 | W-B | IN-C | C-A | N-6 | 0.60 | 11.0 |
| $MgF_2$, 4 | F-C | S-20 | +0.64 | W-A | IN-C | C-A | N-20 | 0.50 | 9.0 |
| $MgF_2$, 8 | F-C | S-21 | +0.82 | W-A | IN-C | C-A | N-21 | 0.50 | 15.7 |
| $MgF_2$, 12 | F-C | S-22 | +0.81 | W-A | IN-C | C-A | N-22 | 0.50 | 17.0 |
| $MgF_2$, 16 | F-C | S-23 | +0.73 | W-A | IN-C | C-A | N-23 | 0.50 | 13.2 |
| $MgF_2$, 20 | F-C | S-24 | +0.72 | W-A | IN-C | C-A | N-24 | 0.50 | 10.3 |

The amount of fluoride allocated separately is shown by the amount used per bead length of 200 m./m.

The next Table 9 shows the basicity and the chemical ingredients of the produced slags in this welding process.

And Table 10 shows the chemical ingredients of the deposit metal made by the use of the fluxes in Group 2.

containing aluminium nitride and 50 kg./mm.² fine-grained steel by using the flux in Group 2 (basicity of +0.37) and the core wire on the market is shown in Table 11. From the result it is known that the content of oxygen in the deposit metal is less in the case where $CaF_2$ and $MgF_2$ are allocated separately than in the case where TABLE 9.—FLUXES OF THE COMPOUND FLUORIDES AND THE CHEMICAL INGREDIENTS OF THE PRODUCED SLAGS

| Flux of the compound fluoride | | Symbol of the produced slag | $SiO_2$ | MnO | CaO | $CaF_2$ | MgO | $MgF_2$ | $Al_2O_3$ | $TiO_2$ | FeO | $B_L$ |
|---|---|---|---|---|---|---|---|---|---|---|---|---|
| Flux allocated separately, grams | Flux for covering | | | | | | | | | | | |
| | F-C | S-1 | 37 | 17 | 17 | 9 | 4 | | 2 | 3 | 3 | -0.54 |
| $CaF_2$, 5 | F-C | S-2 | 33 | 17 | 25 | 9 | 4 | | 2 | 3 | 3 | +0.65 |
| $CaF_2$, 10 | F-C | S-3 | 31 | 16 | 26 | 13 | 4 | | 2 | 3 | 2 | +0.93 |
| $CaF_2$, 15 | F-C | S-4 | 29 | 15 | 27 | 16 | 4 | | 2 | 3 | 2 | +1.13 |
| $CaF_2$, 20 | F-C | S-5 | 27 | 14 | 25 | 20 | 3 | | 2 | 3 | 2 | +1.05 |
| $CaF_2$, 25 | F-C | S-6 | 26 | 13 | 22 | 26 | 3 | | 2 | 3 | 2 | +0.63 |
| $MgF_2$, 4 | F-C | S-20 | 33 | 20 | 19 | 10 | 7 | | 3 | 3 | 4 | +0.64 |
| $MgF_2$, 8 | F-C | S-21 | 32 | 18 | 19 | 10 | 9 | 2 | 2 | 3 | 5 | +0.82 |
| $MgF_2$, 12 | F-C | S-22 | 31 | 16 | 18 | 9 | 9 | 3 | 2 | 3 | 6 | +0.81 |
| $MgF_2$, 16 | F-C | S-23 | 30 | 14 | 18 | 9 | 10 | 9 | 2 | 3 | 5 | +0.73 |
| $MgF_2$, 20 | F-C | S-24 | 29 | 13 | 17 | 8 | 10 | 12 | 2 | 3 | 5 | +0.72 |

TABLE 10.—CHEMICAL COMPOSITION OF THE WELD METAL

[The Case of Fluxes in Group 2]

| Symbol of weld metal | C | Mn | Si | P | S | Mo | Al total | Al sol. | $Al_2O_3$ | AlN | N |
|---|---|---|---|---|---|---|---|---|---|---|---|
| N-1 | 0.10 | 1.30 | 0.32 | 0.018 | 0.013 | 0.60 | 0.170 | 0.140 | 0.054 | 0.001 | 0.014 |
| N-2 | 0.10 | 1.25 | 0.33 | 0.018 | 0.014 | 0.60 | 0.042 | 0.022 | 0.038 | 0.001 | 0.014 |
| N-3 | 0.10 | 1.28 | 0.31 | 0.017 | 0.013 | 0.60 | 0.067 | 0.035 | 0.060 | 0.001 | 0.014 |
| N-4 | 0.10 | 1.25 | 0.29 | 0.018 | 0.014 | 0.60 | 0.080 | 0.045 | 0.066 | 0.001 | 0.014 |
| N-5 | 0.10 | 1.25 | 0.29 | 0.018 | 0.014 | 0.60 | 0.045 | 0.011 | 0.065 | 0.001 | 0.014 |
| N-6 | 0.10 | 1.25 | 0.30 | 0.019 | 0.014 | 0.60 | 0.044 | 0.009 | 0.065 | 0.001 | 0.014 |
| N-20 | 0.09 | 1.07 | 0.34 | 0.017 | 0.013 | 0.50 | 0.034 | 0.015 | 0.037 | 0.001 | 0.011 |
| N-21 | 0.09 | 1.05 | 0.30 | 0.015 | 0.012 | 0.50 | 0.041 | 0.011 | 0.057 | 0.002 | 0.010 |
| N-22 | 0.09 | 1.02 | 0.29 | 0.017 | 0.012 | 0.50 | 0.033 | 0.007 | 0.039 | 0.002 | 0.010 |
| N-23 | 0.08 | 0.99 | 0.28 | 0.015 | 0.013 | 0.50 | 0.031 | 0.006 | 0.044 | 0.002 | 0.009 |
| N-24 | 0.10 | 1.02 | 0.29 | 0.019 | 0.012 | 0.50 | 0.042 | 0.014 | 0.054 | 0.001 | 0.012 |

The result of the analysis by Activac Method (using neutron irradiation process) of the total content of oxygen in the deposit metal which is welded in the welding process of the present invention with ordinary steel, steel they are not allocated separately, the welding process of the present invention is evidently efficient for decreasing the quantity of oxygen in the deposit metal.

TABLE 11.—TOTAL CONTENT OF OXYGEN IN THE WELD METALS, PERCENT

[The Case of Fluxes in Group 2]

| Flux of compound fluorides | | Welding core wire | Welding condition | Mild steel SM41C | Steel containing aluminium nitride weld metal (FLT 2) | IN steel weld metal (IN-C) |
|---|---|---|---|---|---|---|
| Flux allocated separately, grams | Flux for covering | | | | | |
| | F-D | W-A | C-A | 0.074 | 0.063 | 0.070 |
| | | | | | | [1] 0.072 |
| $CaF_2$, 10 | F-D | W-A | C-A | | | |
| | | | | | | [1] 0.056 |
| $CaF_2$, 17.5 | F-D | W-A | C-A | 0.051 | | 0.045 |
| | | | | | [1] 0.038 | [1] 0.050 |
| $CaF_2$, 25 | F-D | W-A | C-A | | | |
| | | | | | | [1] 0.047 |
| $MgF_2$, 6 | F-D | W-A | C-A | | | 0.058 |
| $MgF_2$, 12 | F-D | W-A | C-A | 0.050 | | 0.049 |
| | | | | | [1] 0.043 | [1] 0.047 |
| $MgF_2$, 20 | F-D | W-A | C-A | | | |
| | | | | | | [1] 0.044 |

[1] Mark in lower columns show Mo is contained by 0.50%.

Table 12 shows the result of chemical analysis of the weld metal in the case where only the flux of basicity +0.37 is used and in the case where $CaF_2$ is allocated separately onto which the same flux is sprinkled. And Table 13 shows the result of the chemical analysis of the non-metallic inclusion which are separated from these deposit metals by the electrolytic separation method.

Then the results of the tests comparing the case where only one fluoride is used together with the flux in Group 2 and the case where more than one kinds are compoundly used is shown in Table 14. In either case the basicity of the produced slags is around +0.73 to +1.13, and

TABLE 12.—CHEMICAL COMPOSITION OF WELD METALS, PERCENT

| Symbol of weld metal | C | Mn | Si | P | S | Mo | Al total | Al sol. | $Al_2O_3$ | Mg | Ti | Ca | N |
|---|---|---|---|---|---|---|---|---|---|---|---|---|---|
| M54 | 0.11 | 1.22 | 0.35 | 0.018 | 0.013 | | 0.034 | 0.023 | 0.022 | 0.006 | <0.003 | <0.001 | 0.013 |
| M55 | 0.10 | 1.20 | 0.36 | 0.017 | 0.013 | 0.50 | 0.043 | 0.031 | 0.024 | 0.006 | <0.003 | 0.001 | 0.013 |
| M52 | 0.12 | 1.11 | 0.28 | 0.018 | 0.013 | | 0.027 | 0.008 | 0.037 | 0.003 | <0.002 | 0.001 | 0.012 |
| M53 | 0.11 | 1.11 | 0.30 | 0.018 | 0.013 | 0.50 | 0.029 | 0.006 | 0.042 | 0.007 | 0.004 | 0.001 | 0.012 |

TABLE 13.—RESULTS OF A CHEMICAL ANALYSIS OF THE NON-METALLIC INCLUSION IN THE WELD METALS
[The Case of Fluxes in Group 2, by Electrolytic Separation Method]

| Flux of compound fluorides | | | | | Weld Metal | | | | | | | | |
|---|---|---|---|---|---|---|---|---|---|---|---|---|---|
| Fluorides allocated separately, grams | Flux for covering | Welding core wire | Steel plate | Welding condition | Symbol | Mo, percent | Al | Mn | Si | S | Fe | Mo | C |
| | F-D | W-A | IN-C | C-A | M54 | | 0.019 | 0.007 | 0.007 | 0.008 | 0.038 | 0 | 0.016 |
| | F-D | W-A | IN-C | C-A | M55 | 0.50 | 0.022 | 0.007 | 0.010 | 0.012 | 0.024 | 0.008 | 0.057 |
| $CaF_2$, 17.5 | F-D | W-A | IN-C | C-A | M52 | | 0.033 | 0.005 | 0.001 | 0.001 | 0.019 | 0.002 | 0.057 |
| $CaF_2$, 17.5 | F-D | W-A | IN-C | C-A | M53 | 0.50 | 0.031 | 0.005 | 0.004 | 0.003 | 0.007 | 0.001 | 0.097 |

According to this result it is evident that the content of Si which is the main ingredient in the large type non-metallic inclusion is small, which shows that the content of silicate compound is small and accordingly that the total quantity of oxygen is small. This is the evidence that as mentioned before the fluorine generated from the decomposition of $CaF_2$ or $MgF_2$ separates silicon or silicic compound and expels it out of the metal as gaseous state.

the 2 mm. V-notch Charpy impact valve of the deposit metal at 0° C. is at least 12.6–20.2 kg.-m./cm.$^2$; it is known that the joint use also shows an efficient result.

TABLE 14.—NOTCH TOUGHNESS OF THE WELD METAL IN A SINGLE LAYER
[The Case of Flux in Group 2 Together with Fluoride]

| Produced slag by the new welding process | | | | Welding core wire | Steel material | Welding condition | Weld Metal | | 2 mm. V-notch Charpy impact value (Kgm./cm.$^2$) 0° C. |
|---|---|---|---|---|---|---|---|---|---|
| Symbol | $MgF_2$ mol percent | $CaF_2$ mol percent | BL | | | | Symbol | Mo, percent | |
| S-100 | 0.06 | 0.13 | +0.81 | W-A | IN-A | C-A | T-60 | 0.25 | 17.1 |
| S-105 | 0.04 | 0.13 | +0.82 | W-A | IN-A | C-A | T-60 | 0.25 | 15.2 |
| S-115 | | 0.23 | +1.13 | W-F | IN-A | C-A | T-17 | 0.25 | 13.7 |
| S-105 | 0.04 | 0.13 | +0.82 | W-E | IN-A | C-A | T-64 | 0.20 | 15.3 |
| S-110 | 0.02 | 0.13 | +0.64 | W-E | IN-A | C-A | T-40 | 0.20 | 20.2 |
| S-115 | | 0.23 | +1.13 | W-F | IN-A | C-A | T-36 | 0.20 | 15.4 |
| S-120 | 0.08 | 0.13 | +0.73 | W-F | IN-A | C-A | T-24 | 0.12 | 13.4 |
| S-125 | | 0.31 | +1.05 | W-D | IN-A | C-A | T-27 | 0.25 | 13.3 |
| S-115 | | 0.23 | +1.13 | W-A | IN-D | C-A | T-92 | 0.25 | 12.6 |
| S-115 | | 0.23 | +1.13 | W-D | IN-D | C-A | T-89 | 0.25 | 13.7 |

The following Table 15 shows 2 mm. V-notch Charpy impact value of deposited metal at 0° C., the basicity of produced slags when welding the steel with the mechanical mixture of the flux in Group 2, and $MgF_2$ and $CaF_2$. It was found that in this case every impact value of any slag falls between 15–18 kg.m./cm.$^2$.

TABLE 15.—NOTCH TOUGHNESS OF A WELD METAL IN A SINGLE LAYER
[The Case of Mild Steel Weld Metal]

| Produced slag by the new welding process | | | | Welding core wire | Steel material | Welding condition | Weld Metal | | 2 mm. V-notch Charpy impact value (Kgm./cm.$^2$) 0° C. |
|---|---|---|---|---|---|---|---|---|---|
| Symbol | $MgF_2$ (mol percent) | $CaF_2$ (mol percent) | BL | | | | Symbol | Mo, percent | |
| S-115 | | 0.23 | +1.13 | W-A | FLT | C-A | R-31 | | 15.4 |
| S-100 | 0.06 | 0.13 | +0.81 | W-A | FLT | C-A | R-42 | | 18.3 |
| S-130 | | 0.27 | +0.95 | W-C | SM50 | C-A | R-62 | | 15.4 |
| S-130 | | 0.27 | 0.95 | W-C | SM50 | C-A | R-63 | 0.50 | 16.2 |

As shown in the following Table 16, when the basicity of the produced slag is +0.82 the 2 mm. V-notch Charpy TABLE 16.—NOTCH TOUGHNESS OF A SINGLE LAYER WELD METAL
[The Case of High-Tension IN Steel]

| Produced slag, $B_L$ | Welding core wire | Steel material | Welding condition | Weld Metal Symbol | Mo, percent | 2 mm. V-notch Charpy impact value (Kgm./cm.$^2$) $-75°$ C. |
|---|---|---|---|---|---|---|
| 0.82 | W–B | IN–80 | C–B | H20 | 0.70 | 4.8 | impact value is 4.8 kg.-m./cm.$^2$ at $-75°$ C. when the high-tough high-tension steel is welded; the fact that this value can be attained at such a low temperature proves how this welding process is efficient.

The result of the case where the welding process of the present invention is applied to tandem type submerged arc welding process is shown in Tables 17 and 18. Similarly when the basicity of the produced slag is controlled The welding process of the present invention can also be applied to $CO_2$ gas arc welding process and the result is just the same as the one mentioned above. This can be seen from Table 19 which shows the basicity of the produced slags in $CO_2$ gas arc welding process using the the fluoride whose basicity is about $-0.40$ in addition to $CaF_2$ and $MgF_2$, and 2 mm. V-notch Charpy impact value at $0°$ C. and $-20°$ C. of the deposit metal. It was found that 2 mm. V-notch Charpy impact value is 13.4–21.3 kg.-m./cm.$^2$ at $0°$ C. and 11.1–14.0 kg.m./cm.$^2$ at $-20°$ C.

TABLE 19.—NOTCH TOUGHNESS OF WELD METALS IN A SINGLE LAYER BY $CO_2$ GAS ARC WELDING PROCESS

| Flux containing plural number of fluorides | | Produced slag | | Welding core wire | Steel plate | Welding condition | Weld Metal | | 2 mm. V-notch Charpy impact value | |
|---|---|---|---|---|---|---|---|---|---|---|
| Flux | Mixed fluorides percent | Symbol | $B_L$ | | | | Symbol | Mo, percent | $0°$ C. (Kgm./cm.$^2$) | $-20°$ C. (Kgm./cm.$^2$) |
| F–E | $CaF_2$, 13 | S–30 | | W–C | IN B | C C | D 118 | 0.12 | 13.6 | 11.1 |
| F–E | $CaF_2$, 13 | S 31 | | W E | IN B | C–C | D–28 | 0.33 | 13.4 | 11.2 |
| F–E | $CaF_2$, 13 | S–32 | $-0.26$ | W–F | IN B | C C | D–80 | | 15.7 | |
| F–E | $CaF_2$, 13 | S–33 | | W–F | IN–B | C–C | D–81 | 0.12 | 21.3 | |
| F–E | $CaF_2$, 13 | S–34 | | W–F | IN–B | C–C | D–85 | 0.24 | 17.0 | |
| F–E | $MgF_2$, 15 | S–35 | | W–C | IN–B | C–C | D–124 | 0.12 | 16.2 | 12.5 |
| F–E | $MgF_2$, 15 | S 36 | | W D | IN B | C–C | D–101 | 0.12 | 15.0 | 14.4 |
| F–E | $MgF_2$, 15 | S–37 | $-0.05$ | W–F | IN–B | C–C | D–133 | 0.12 | 17.0 | 14.9 |
| F–E | $MgF_2$, 15 | S–38 | | W–F | IN–B | C–C | D–82 | 0.12 | 19.2 | |
| Once melted F–E | | S–39 | | W–F | IN–B | C–C | D–137 | | 15.6 | 13.2 |

TABLE 17.—NOTCH TOUGHNESS OF A WELD METAL IN A SINGLE LAYER BY BIPOLAR (TANDEM SYSTEM) SUBMERGED ARC WELDING PROCESS

| Produced slag $B_L$: | Welding core wire | Steel material | Welding condition | Weld metal Symbol | Mo, percent | 2 mm. V-notch Charpy impact value $0°$ C. (Kgm./cm.$^2$) | $-17°$ C. (Kgm./cm.$^2$) |
|---|---|---|---|---|---|---|---|
| +0.23 | W–E | IN–B | C–C | A–19 | 0.21 | 15.9 | 13.4 | at about +0.23 such a high 2 mm. V-notch Charpy impact value of deposit metal as 15.9 kg.-m./cm.$^2$ at $0°$ C. and 13.4 kg.-m./cm.$^2$ at $-17°$ C. can also be obtained. Table 18 shows the result of the chemical analysis of the said deposit metal.

The following Table 20 shows the basicity, the chemical composition, and so forth of the produced slags in these TABLE 20.—CHEMICAL COMPOSITION OF THE PRODUCED SLAGS IN $CO_2$ GAS ARC WELDING PROCESS, PERCENT

| Fluxes | Flux containing plural number of fluorides | | Symbols of produced slags | $TiO_2$ | $Al_2O_3$ | MnO | $SiO_2$ | FeO | CaO | $CaF_2$ | MgO | $MgF_2$ | $B_L$ |
|---|---|---|---|---|---|---|---|---|---|---|---|---|---|
| | Fluxes | Mixed fluorides, percent | | | | | | | | | | | |
| F–E | | | | 27 | 4 | 13 | 12 | 30 | | | 4 | | $-0.40$ |
| | F–E | $CaF_2$, 13 | S–30 | 30 | 18 | 17 | 6 | 2 | 6 | 10 | 4 | | $-0.26$ |
| | F–E | $MgF_2$, 15 | S–35 | 29 | 12 | 18 | 4 | 2 | | | 9 | 11 | $-0.05$ |

TABLE 18.—CHEMICAL COMPOSITION OF A WELD METAL IN A SINGLE LAYER BY BIPOLAR (TANDEM SYSTEM) SUBMERGED ARC WELDING PROCESS, PERCENT

| | |
|---|---|
| Symbol of the weld metal | A–19 |
| C | 0.09 |
| Mn | 1.50 |
| Si | 0.29 |
| P | 0.016 |
| S | 0.015 |
| Mo | 0.21 |
| Al total | 0.055 |
| Al sol. | 0.031 |
| $Al_2O_3$ | 0.044 |
| AlN | 0.002 |
| N | 0.012 |

$CO_2$ gas arc welding process. Table 21 shows the chemical analysis of the said deposit metal.

As has been described above, the deposit metal having high toughness can be also obtained by $CO_2$ gas arc welding in which the relative content share of the fluorides and the fluxes on the market is so determined as to maintain the basicity of the produced slags neutral or weak acidic as is in the said submerged arc welding, with the said fluorides and the fluxes being allocated to the beveling part separately. The proper vasicity of the produced slags is found to be $-1.00$–+1.25 from the experiments.

Further it has been verified by experiments that the deposit metal having high toughness be obtained from the fluxes whose main ingredient is titanium oxide if the basicity of the slags is maintained in the said area. The

TABLE 21.—CHEMICAL COMPOSITION OF THE WELD METAL IN CO₂ GAS ARC WELDING

| Symbol of the weld metal | C | Mn | Si | P | S | Mo | Ti | Al total | Al sol. | AlN | N |
|---|---|---|---|---|---|---|---|---|---|---|---|
| D-118 | 0.08 | 1.21 | 0.36 | 0.010 | 0.016 | | 0.022 | 0.026 | 0.010 | 0.005 | 0.02 |
| D-28 | | | | | | | | | | | |
| D-80 | 0.09 | 1.53 | 0.71 | 0.009 | 0.017 | | 0.023 | 0.029 | 0.004 | 0.006 | 0.013 |
| D-81 | 0.08 | 1.53 | 0.65 | 0.010 | 0.018 | 0.11 | 0.032 | 0.024 | 0.007 | 0.003 | 0.011 |
| D-85 | 0.10 | 1.15 | 0.38 | 0.011 | 0.017 | 0.16 | 0.027 | 0.034 | 0.014 | 0.004 | 0.014 |
| D-124 | 0.09 | 1.20 | 0.27 | 0.010 | 0.015 | 0.11 | 0.018 | 0.030 | 0.016 | 0.003 | 0.013 |
| D-101 | 0.10 | 1.33 | 0.28 | 0.010 | 0.016 | 0.13 | 0.015 | 0.027 | 0.012 | 0.006 | 0.014 |
| D-133 | 0.10 | 1.25 | 0.49 | 0.010 | 0.016 | 0.12 | 0.021 | 0.025 | 0.011 | 0.004 | 0.011 |
| D-82 | 0.09 | 1.28 | 0.54 | 0.009 | 0.017 | 0.12 | 0.020 | 0.023 | 0.010 | 0.003 | 0.012 |
| D-137 | | | | | | | | | | | | next Table 22 shows an example of a typical composition. It goes without saying that the fluorides such as $CaF_2$, $MgF_2$, etc. are allocated separately for welding.

TABLE 22

An example of the flux whose main ingredient is titanium oxide.

| | Percent |
|---|---|
| $TiO_2$ | 26–37 |
| $Al_2O_3$ | 12–24 |
| MnO | 8–20 |
| $SiO_2$ | 4–15 |
| FeO | 3–12 |
| $CaF_2$ | 10–20 |
| $MgF_2$ | 6–20 |
| CaO | 4–10 |
| MgO | 5–15 |

It should be taken as granted that double submerged arc welding process, other various types of submerged arc welding process, $CO_2$ gas arc welding process, etc. can as well be adopted as the embodiments of the welding process of the present invention.

What I claim is:

1. A high toughness deposit metal electric arc welding process characterized by that a fluoride or mechanical mixture of fluorides which pyrolizes at the temperature prevailing directly below the electric arc, and generates fluorine gas as the first product of decomposition which combines with silicon oxide and silicate compounds in a deposit metal to evaporate and expel the said silicon oxide and silicate compound out of the deposit metal, and also generates metals as the second product of decomposition which have strong deoxidizing and desulphurizing effects at the same time, is allocated to a part of the workpiece which is bevelled, the surface of the workpiece surrounding the bevel being covered with a neutral or weakly acidic flux to be welded, and by that the relative composition ratio of fluorides being so controlled that after welding the slag produced on said surface of the workpiece contain a total of 0.13–0.35 mol percent of said fluoride or mechanical mixture of fluorides and the basicity of said slag calculated from the formula basicity $\Sigma a_i N_i$, in which N is the number of moles of the respective oxide $i$ and $a$ is a constant characteristic for that oxide, falls in the range of $-0.50$ to $+1.25$, and the welding of a single or a small number of layers being carried out with a large heat input.

2. A high toughness deposit metal welding process according to claim 1 characterized by that the fluoride or mechanical mixture of fluorides is in the form of a sheath about a welding wire constituted of iron or in the form of a core within a hollow cylinder of iron for the welding.

3. A high toughness deposit metal welding process according to claim 2 characterized by that the hollow cylinder is inserted into the welding bevel from outside thereof and is continuously and automatically supplied during the welding process.

4. A high toughness deposit metal welding process according to claim 1 characterized by that the welding is carried out in an atmosphere of argon gas, helium gas or $CO_2$ gas.

5. A high toughness deposit metal welding process according to claim 1 characterized by that the welding process is applied to a tandem type submerged arc welding process.

References Cited
UNITED STATES PATENTS

| 2,909,642 | 10/1959 | Landis | 219—73 |
| 3,153,719 | 10/1964 | Arikawa et al. | 219—73 |
| 3,200,232 | 8/1965 | Danhier | 219—73 |
| 3,243,568 | 3/1966 | Burden | 219—73 |
| 3,307,014 | 2/1967 | Bada et al. | 219—73 |

JOSEPH V. TRUHE, Primary Examiner

W. DEXTER BROOKS, Assistant Examiner